(12) United States Patent
Lee et al.

(10) Patent No.: US 8,688,273 B2
(45) Date of Patent: Apr. 1, 2014

(54) WALKING CONTROL APPARATUS OF ROBOT AND METHOD OF CONTROLLING THE SAME

(75) Inventors: Ju Suk Lee, Suwon-si (KR); Woong Kwon, Seongnam-si (KP); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 454 days.

(21) Appl. No.: 13/005,262

(22) Filed: Jan. 12, 2011

(65) Prior Publication Data
US 2011/0178637 A1 Jul. 21, 2011

(30) Foreign Application Priority Data
Jan. 18, 2010 (KR) .................. 10-2010-0004287

(51) Int. Cl.
*G05B 19/19* (2006.01)
(52) U.S. Cl.
USPC ............................................. 700/254; 901/1
(58) Field of Classification Search
USPC ................. 700/245, 246, 251, 253, 260, 261; 318/568.1, 568.12, 568.16, 568.17, 318/568.2; 901/1, 9, 46
See application file for complete search history.

(56) References Cited

U.S. PATENT DOCUMENTS

| | | | |
|---|---|---|---|
| 5,337,235 A | | 8/1994 | Takahashi et al. |
| 7,337,039 B2 * | | 2/2008 | Takenaka et al. ............. 700/245 |
| 7,848,849 B2 * | | 12/2010 | Hasegawa ..................... 700/260 |
| 7,873,436 B2 * | | 1/2011 | Takenaka ....................... 700/250 |
| 8,020,649 B2 * | | 9/2011 | Ogawa ........................... 180/8.5 |
| 8,108,070 B2 * | | 1/2012 | Tajima ........................... 700/245 |

FOREIGN PATENT DOCUMENTS

| | | |
|---|---|---|
| EP | 1 018 467 A1 | 7/2000 |
| EP | 1 980 373 A1 | 10/2008 |

OTHER PUBLICATIONS

European Search Report dated Apr. 28, 2011 in corresponding European Patent Application 11151255.4.

\* cited by examiner

*Primary Examiner* — Dalena Tran
(74) *Attorney, Agent, or Firm* — Staas & Halsey LLP

(57) ABSTRACT

A walking control apparatus of a robot includes a joint portion provided in each of a plurality of legs of the robot, a pose sensing unit to sense the pose of the robot, a walking state determination unit to determine a walking state from the pose of the robot, a knot point compensation value calculator to determine a Center Of Mass (COM) of the robot from the pose of the robot and to calculate a knot point compensation value, a desired angle trajectory generator to generate a reference knot point of the joint portion corresponding to the walking state, to compensate for the reference knot point using the knot point compensation value so as to generate a desired knot point, and to generate a desired angle trajectory of the joint portion using the desired knot point. The knot point which is the angle command of the joint portion of each of the legs to perform the next step is compensated for based on the COM, and the compensated desired knot point is smoothly connected using the spline curve such that the robot walks similar to a human. In addition, in order to maintain balance while walking, the angle of the joint portion of the intermediate point of the current step is fed back and the knot point of the next step is predicted and adjusted, such that the robot stably and smoothly walks.

23 Claims, 12 Drawing Sheets

WALKING CONTROL APPARATUS OF ROBOT AND METHOD OF CONTROLLING THE SAME

CROSS-REFERENCE TO RELATED APPLICATION

This application claims the priority benefit of Korean Patent Application No. 10-2010-0004287, filed on Jan. 18, 2010 in the Korean Intellectual Property Office, the disclosure of which is incorporated herein by reference.

BACKGROUND

1. Field

Embodiments relate to a walking control apparatus of a robot which stably walks by controlling the driving of a joint portion provided in each of a plurality of legs, and a method of controlling the same.

2. Description of the Related Art

A robot is a machine which has a joint structure similar to that of a human and performs the same operations as the hands and feet of a human using the joint structure.

Initially, industrial robots for automated and unmanned production tasks were developed. However, recently, a service robot to provide various services to a human has been actively developed.

Such a service robot mostly provides a service to a human while walking similar to a human. Accordingly, research into walking of the robot has been actively conducted.

Examples of a walking control method of a robot include a position-based Zero Moment Point (ZMP) control method (which follows a desired position of a robot joint), a torque-based dynamic walking control method (which follows desired torque of a robot joint), and a Finite State Machine (FSM) control method.

In the ZMP control method, a walking direction, a stride width, a walking rate and the like are determined in advance to satisfy a ZMP constraint, that is, a condition in which a ZMP is present in a safe area (which corresponds to the area of one foot in the case where the robot is supported by one foot or corresponds to a small area which is set in consideration of safety in a convex polygon including the areas of two feet in the case where the robot is supported by two feet) of a stance polygon formed by stances of legs of the robot, the walking pattern of each leg corresponding to the determination is generated, and the walking trajectory of each leg is calculated according to the walking pattern.

The position of the joint of each leg is calculated by inverse Kinematic calculation of the calculated walking trajectory, and a desired control value of each joint is calculated based on the current angle and the desired angle of each joint.

The torque-based dynamic walking control method is implemented by servo control to enable each leg to follow the calculated walking trajectory during every control time period. That is, it is detected whether the position of each leg accurately follows the walking trajectory according to the walking pattern while walking. When each leg deviates from the walking trajectory, the torque of the motor is controlled such that each leg accurately follows the walking trajectory.

In the FSM control method, the robot does not walk so as to follow the position during every control time period, operation states of the walking robot are set in advance, desired torques of joints are calculated by referring to the operation states (indicating the states of the FSM) while walking, and the robot walks to follow the desired torques of the joints.

In the FSM control method, the robot adopts various poses by changing the operation state while walking. However, since each pose is adopted in a restricted operation state, a separate operation to maintain balance of the robot is performed regardless of a walking operation to perform a task.

Since the ZMP control method is the position-based control method, accurate position control is possible. However, accurate angle control of each joint is performed, high servo gain is necessary. Accordingly, since high current is necessary, energy efficiency is low and joint rigidity is high, thereby applying considerable shock to walking surfaces.

In order to calculate the angle of each joint from the walking pattern of the foot and a given Center Of Gravity (COG) through inverse kinematics, Kinematic Singularity needs to be avoided. Thus, the robot always bends its knees while walking. Thus, the robot may unnaturally walk unlike a human.

In the torque-based dynamic walking control method, a dynamic equation needs to be solved for stable walking. However, since the dynamic equation of a robot having legs with six degrees of freedom to implement a certain direction in a space is very complicated, such a method has been applied to a robot having legs with four degrees of freedom.

In the FSM control method, since control is performed by a torque command and an elasticity mechanism is applied, energy efficiency is high and rigidity is low, thereby providing safety to surroundings. However, since it is difficult to perform accurate position control, it is difficult to perform accurate whole-body motion such as ascending of stairs or avoidance of an obstacle.

SUMMARY

Therefore, it is an aspect to provide a walking control apparatus of a robot to maintain stable walking of the robot, and a method of controlling the same.

It is another aspect to provide a walking control apparatus of a robot to improve walking efficiency and performance of the robot, and a method of controlling the same.

Additional aspects of the invention will be set forth in part in the description which follows and, in part, will be obvious from the description, or may be learned by practice of the invention.

In accordance with one aspect, there is provided a walking control apparatus of a robot including: a joint portion provided in each of a plurality of legs of the robot; a pose sensing unit to sense the pose of the robot; a walking state determination unit to determine a walking state from the pose of the robot; a knot point compensation value calculator to determine a Center Of Mass (COM) of the robot from the pose of the robot and to calculate a knot point compensation value; and a desired angle trajectory generator to generate a reference knot point of the joint portion corresponding to the walking state, to compensate for the reference knot point using the knot point compensation value so as to generate a desired knot point, and to generate a desired angle trajectory of the joint portion using the desired knot point.

The walking control apparatus may further include a torque calculator to calculate torque to follow the desired angle trajectory, and a servo controller to output the torque to the joint portion and to control the walking of the robot.

The desired angle trajectory generator may include a spline generator to connect the desired knot point using a spline curve.

The knot point compensation value calculator may determine an angular speed of a change in COM, compare the angular speed of the change in COM with a reference angular speed, and calculate the knot point compensation value.

The knot point compensation value calculator may determine a distance of a change in COM in an X-axis direction, compare the determined distance of the change in COM with a reference distance, and calculate the knot point compensation value.

The knot point compensation value calculator may determine a distance of a change in COM in a Y-axis direction, compare the determined distance of the change in COM with a reference distance, and calculate the knot point compensation value.

The desired knot point may be at least one of a desired roll angle and a desired pitch angle of the hip joint portion.

The walking state determination unit may determine a stance leg which touches the ground and a swing leg which does not touch the ground.

The desired angle trajectory generator may generate the reference knot point of the joint portion of each of the stance leg and the swing leg, compensate for the reference knot point using the knot point compensation value, and generate the desired angle trajectory of the joint portion of each of the support leg and the swing leg using the compensated knot point.

The desired angle trajectory generator may generate the reference knot point of the joint portion of the swing leg, compensate for the reference knot point using the knot point compensation value, and generate the desired angle trajectory of the joint portion of the swing leg using the compensated knot point.

In accordance with another aspect, there is provided a walking control method of a robot including: determining a walking state of the robot when the robot walks; generating a reference knot point corresponding to the walking state of the robot; sensing a Center Of Mass (COM) of the robot so as to calculate a knot point compensation value; generating a desired knot point obtained by compensating for the reference knot point using the knot point compensation value; and connecting the desired knot point so as to generate a desired angle trajectory of a joint portion provided in each leg of the robot.

The walking control method may further include calculating torque to follow the desired angle trajectory, and generating and outputting a Pulse Width Modulation (PWM) signal corresponding to the torque to the joint portion of the robot.

The generating of the desired angle trajectory may include connecting the desired knot point using a spline curve.

The determining of the walking state may include sensing a weight applied to each foot of the robot, determining that a leg to which the weight is applied is a stance leg which touches the ground, and determining that a leg to which the weight is not applied is a swing leg which does not touch the ground.

The calculating of the knot point compensation value may include determining an angular speed of the COM of an X-axis direction, and comparing the determined angular speed of the COM of the X-axis direction with a reference angular speed so as to calculate the knot point compensation value.

The generating of the desired angle trajectory may include generating a pitch desired angle trajectory of a hip joint portion provided in each of the legs of the robot.

The generating of the desired angle trajectory may include generating a pitch desired angle trajectory of the hip joint portion provided in each of a stance leg and a swing leg of the robot.

The calculating of the knot point compensation value may include determining a distance of a change in COM in an X-axis direction, comparing the determined distance of the change in COM in the X-axis direction with a reference distance of the X-axis direction so as to calculate a pitch knot point compensation value, determining a distance of a change in COM in a Y-axis direction, and comparing the determined distance of the change in COM in the Y-axis direction with a reference distance of the Y-axis direction so as to calculate a roll knot point compensation value.

The generating of the desired angle trajectory may include generating a roll desired angle trajectory of a hip joint portion provided in each leg of the robot, and generating a pitch desired angle trajectory of the hip joint portion provided in each of the legs of the robot.

The generating of the desired angle trajectory may include generating a roll desired angle trajectory and a pitch desired angle trajectory of the hip joint portion provided in a swing leg of the robot.

The walking control method may further include calculating a knot point compensation value at a current step while the robot walks, generating a reference knot point of a next step while the robot walks, and compensating for the reference knot point of the next step so as to generate the desired angle trajectory of the joint portion of the next step.

According to the embodiments, since the robot walks by Finite State Machine (FSM) control and torque servo control, the rotation angles of the joint portions do not need to be accurately controlled. Thus, the robot walks with low servo gain and energy consumption is decreased.

Since the robot walks with low servo gain, each of the joints has low rigidity and thus shock generated by collision with surroundings is decreased.

Since the robot walks while extending its knee, the robot walks similar to a human. A human-friendly robot is implemented and energy necessary for bending the knee of the robot is conserved.

The knot point which is the angle command of the joint portion of each of the legs to perform the next step is compensated for based on the COM, and the compensated desired knot point is smoothly connected using the spline curve such that the robot walks similar to a human.

In addition, in order to maintain balance while walking, the angle of the joint portion of the intermediate point of the current step is fed back and the knot point of the next step is predicted and adjusted, such that the robot stably and smoothly walks.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings.

Figure 1:
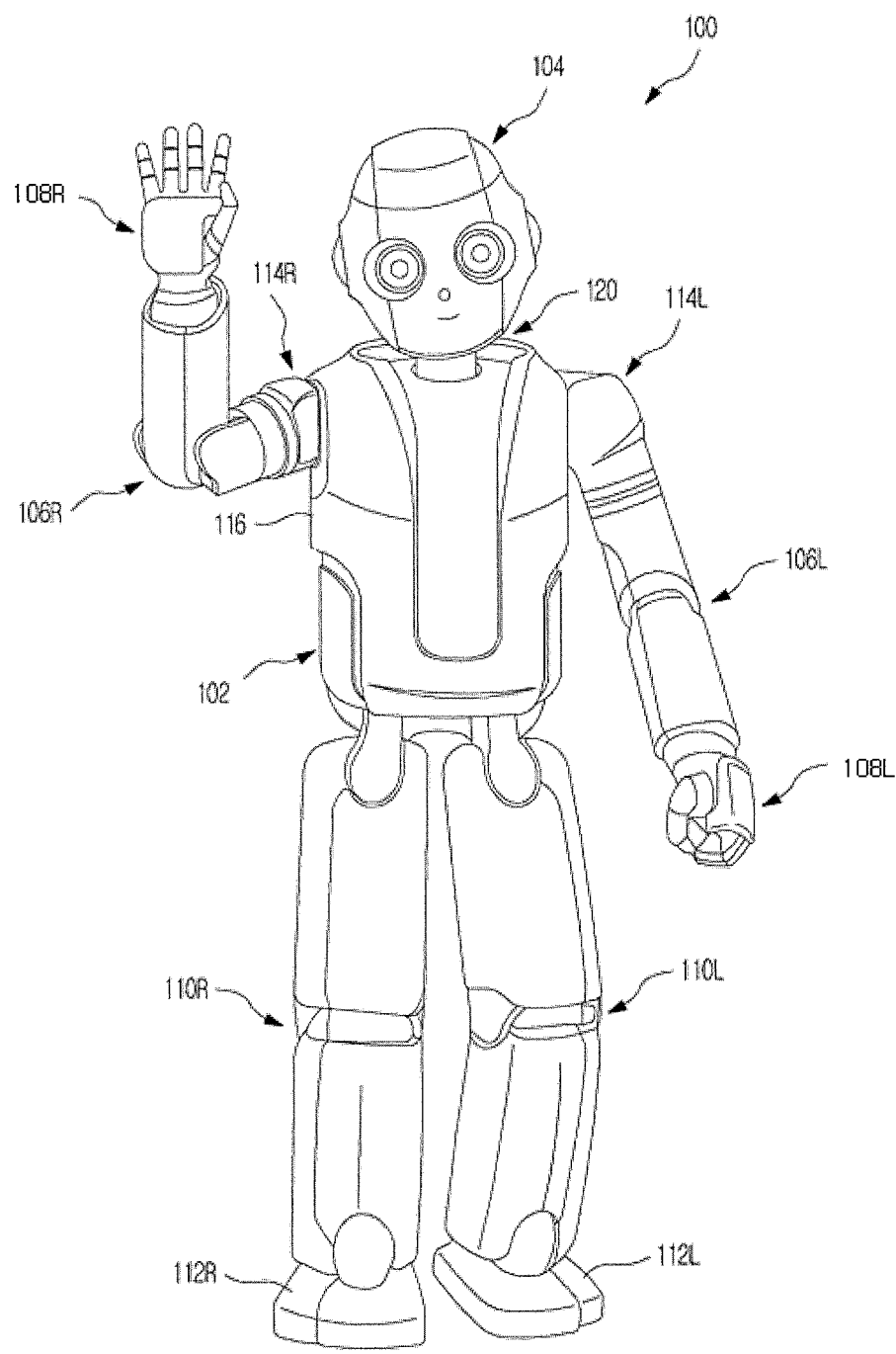
FIG. 1 illustrates a robot according to an embodiment.
Figure 2:
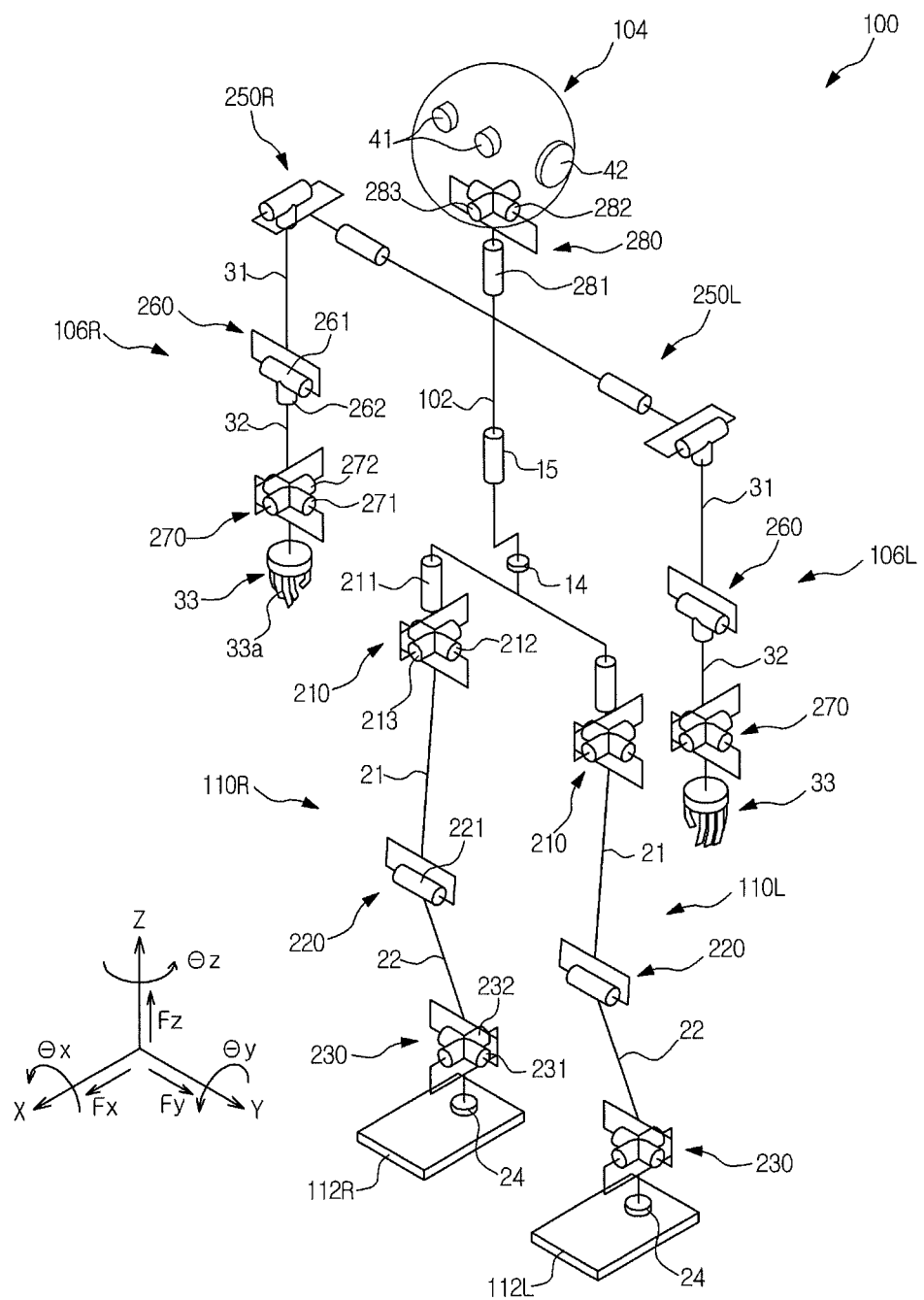
FIG. 2 illustrates a joint structure of the robot according to the embodiment.

FIG. 1 is a diagram showing a robot according to an embodiment of the present invention, and FIG. 2 is a diagram showing a joint structure of the robot according to the embodiment of the present invention.

As shown in FIG. 1, the robot 100 includes an upper body including a head, a torso and arms and a lower body including a plurality of legs.

More particularly, the upper body of the robot 100 includes the torso 102, the head 104 connected to an upper portion of the torso 102 through a neck 120, two arms 106L and 106R connected to both sides of the upper portion of the torso 102 through shoulders 114L and 114R, and hands 108L and 108R connected to respective ends of the two arms 106L and 106R.

The lower body of the robot 100 includes two legs 110L and 110R connected to both sides of a lower portion of the torso 102 of the upper body and feet 112L and 112R connected to respective ends of the two legs 110L and 110R.

Each of the head 104, the two arms 106L and 106R, the two legs 110L and 110R, the two hands 108L and 108R and the two feet 112L and 112R many have a predetermined degree of freedom through respective joints.

The inside of the torso 102 of the upper body is protected by a cover 116. In reference numerals, "R" and "L" denote the right and left of the robot 100, respectively.

As shown in FIG. 2, cameras 41 to photograph surroundings and a microphone 42 to receive user voice are provided in the head 104.

The head 104 is connected to the torso 102 of the upper body through a neck joint portion 280. The neck joint portion 280 includes a rotation joint 281 of a yaw direction, a rotation joint 282 of a pitch direction and a rotation joint 283 of a roll direction and has three degrees of freedom.

Head rotation motors (not shown) are connected to the rotation joints 281, 282 and 283 of the neck joint portion 280.

The shoulder joint portions 250L and 250R are mounted on both sides of the torso 102 of the upper body to connect the two arms 106L and 106R to the torso 102 of the upper body.

Each of the two arms 106L and 106R many have a humerus portion 31, a forearm bone portion 32 and a hand 33.

More particularly, the humerus portion 31 may be connected to the upper body 102 through the should joint portion 250L or 250R, the humerus portion 31 and the forearm bone portion 32 are connected to each other through an elbow joint portion 260, and the forearm bone portion 32 and the hand 33 may be connected to each other through a wrist joint portion 270.

The elbow joint portion 260 may include a rotation joint 261 of a pitch direction and a rotation joint 262 of a yaw direction and may have two degrees of freedom. The wrist joint portion 270 includes a rotation joint 271 of a pitch direction and a rotation joint 272 of a roll direction and may have two degrees of freedom.

The hand 33 may include five fingers 33a. A plurality of joints (not shown) driven by motors may be provided in the hand 33. The fingers 33a perform various operations such as grasping of an object or indication of a specific direction in interlock with motion of the arm 106.

A rotation joint 15 of a yaw direction is provided in the torso 102 of the upper body such that the upper body rotates.

In addition, a rotation joint 15 of a yaw direction is provided between a chest and a waist of the torso 102 of the upper body such that the chest is rotated relative to the waist.

An upper-body pose sensor 14 to detect an inclination angle of the upper body relative to a vertical axis and an angular speed thereof may be further included in the torso 102 of the upper body.

Each of the two legs 110L and 110R of the robot 100 has a thighbone portion 21, a fibula portion 22 and the feet 112L and 112R.

The thighbone portion 21 is connected to the torso 102 of the upper body through a hip joint portion 210, the thighbone portion 21 and the fibula portion 22 are connected to each other through a knee joint portion 220, and the fibula portion 22 and the foot 112L or 112R are connected to each other through an ankle joint portion 230.

The hip joint portion 210 may have three degrees of freedom. More particularly, the hip joint portion 210 includes a rotation joint 211 of a yaw direction (Z-axis rotation), a rotation joint 212 of a pitch direction (Y-axis rotation) and a rotation joint 213 of a roll direction (X-axis rotation).

The knee joint portion 220 may include a rotation joint 221 of a pitch direction and may have one degree of freedom.

The ankle joint portion 230 includes a rotation joint 231 of a pitch direction and a rotation joint 232 of a roll direction and has may have degrees of freedom.

Since six rotation joints are provided in each of the two legs 110L and 110R with respect to the three joint portions 210, 220 and 230, 12 rotation joints are provided with respect to two legs 110L and 110R.

Meanwhile, in each of the two legs 110L and 11R, a multi-axis Force and Torque (FIT) sensor 24 is mounted between the foot 112L or 112R and the ankle joint portion 230. The FIT sensor 24 measures three directional components Fx, Fy and Fz of force transferred from the foot 112L or 112R and three directional components θx, θy and θz of moment so as to detect landing of the foot 112L or 112R and load applied to the foot 112L or 112R, thereby generating the pose information of the robot.

Although not shown in the drawings, actuators such as motors to drive the rotation joints are provided in the robot 100. A control unit to control the overall operation of the robot 100 adequately controls the motors so as to perform various operations of the robot 100.

Figure 3:
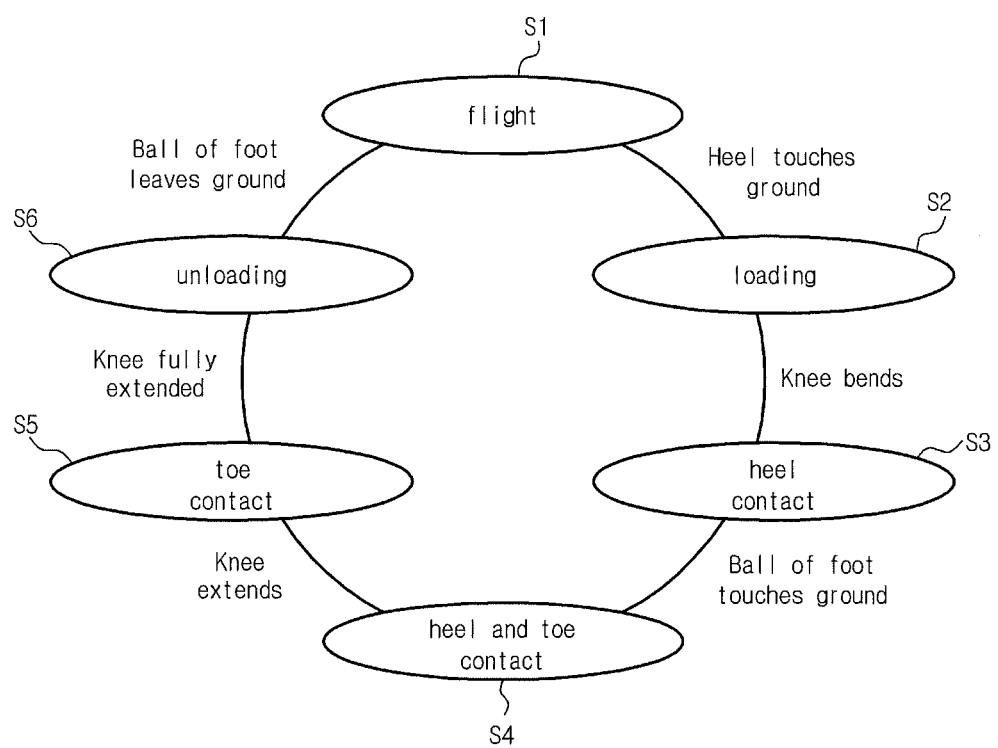
FIG. 3 illustrates the state of a leg when the robot walks according to the embodiment.

FIG. 3 is a diagram showing the states of the leg when the robot of the embodiment walks, that is, leg states of the robot and control operations of the leg states when the robot takes a step based on a Finite State Machine (FSM) of the walking control device of the robot.

When the robot takes a step, a first state S1 (flight) denotes a pose in which one leg swings, a second state S2 (loading) denotes a pose in which one foot is put down on the ground, a third state S3 (heel contact) denotes a pose in which the heel of one foot touches the ground, a fourth state S4 (heel and toe contact) denotes a pose in which the heel and the toe of one foot simultaneously touch the ground, a fifth state S5 (toe contact) denotes a pose in which one toe touches the ground, and a six state S6 (unloading) denotes a pose in which one foot is raised from the ground.

In order to switch one state to another state, a control action to switch the state is necessary. If the first state S1 is switched to the second state S2 (S1→S2), a control operation (heel touches the ground) to enable the heel of the foot to touch the ground is necessary. If the second state S2 is switched to the third state S3 (S2→S3), a control operation (knee bends) to bend the knee of the foot which touches the ground is necessary. If the third state S3 is switched to the fourth state S4 (S3→S4), a control operation (ball of foot touches the ground) to enable the toe of the foot to touch the ground is necessary. If the fourth state S4 is switched to the fifth state S5 (S4→S5), a control operation (knee extends) to extend the knee of the foot which touches the ground is necessary. If the fifth state S5 is switched to the sixth state S6 (S5→S6), a control operation (knee fully extended) to fully extend the knee of the foot which touches the ground is necessary. If the sixth state S6 is switched to the first state S1 (S6→S1), a control operation (ball of foot leaves the ground) to raise the toe of the foot from the ground is necessary.

In this way, in order to control the action of the leg when the robot walks, the angles of the joint portions need to be controlled.

Accordingly, in order to execute the control action to switch the leg state when the robot walks, the angle trajectories of the joint portions of a predetermined next step are extracted, the angle trajectories of the joint portions are compensated for based on a Center of Mass (COM) of the robot, torque to follow the compensated angle trajectories of the joint portions is calculated, and the joint portions are driven based on the calculated torque.

At this time, the actuators such as the motors provided in the joint portions of the robot are driven.

When the robot walks, the robot may stably and naturally walk while maintaining balance. This will be described in detail with reference to FIG. 4.

Figure 4:
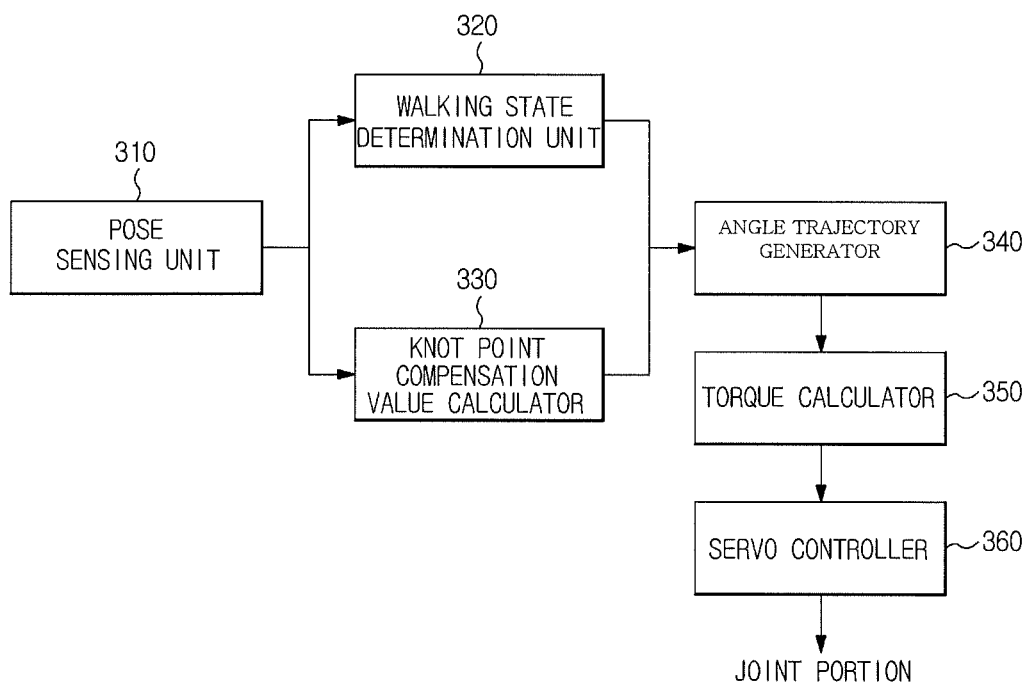
FIG. 4 illustrates the configuration of the walking control apparatus of the robot, according to the embodiment.

FIG. 4 illustrates the configuration of the walking control apparatus of the robot according to the embodiment.

When a walking command is transmitted from a user interface (not shown), the walking control apparatus of the robot controls the driving of an actuator such as a motor provided in the joint portion 210 based on a user command input through the user interface (not shown) and the pose of the robot, such that the robot stably walks.

The walking control apparatus of the robot may include a pose sensing unit 310, a walking state determination unit 320, a knot point compensation value calculator 330, a angle trajectory generator 340, a torque calculator 350, and a servo controller 360.

The pose sensing unit 310 senses the pose of the robot and transmits the sensed pose information to the walking state determination unit 320 and the knot point compensation value calculator 330. The pose information of the robot includes information indicating whether or not the robot lands, information about a stance leg and a swing leg, which are changed by landing, and information about a Center Of Mass (COM) of the robot.

The pose sensing unit 310 may include a COM sensor (not shown) to sense the COM of the robot and a force/torque sensor 24 to sense whether the robot lands and to sense a stance leg and a swing leg according to whether the robot lands.

The COM sensor of the pose sensing unit 310 senses the COM of the robot based on the rotation angle of each joint portion corresponding to the actual pose of the robot when the robot walks, calculates a change in sensed COM, and transmits the calculated change in COM to the knot point compensation value calculator 330.

Figure 5A:
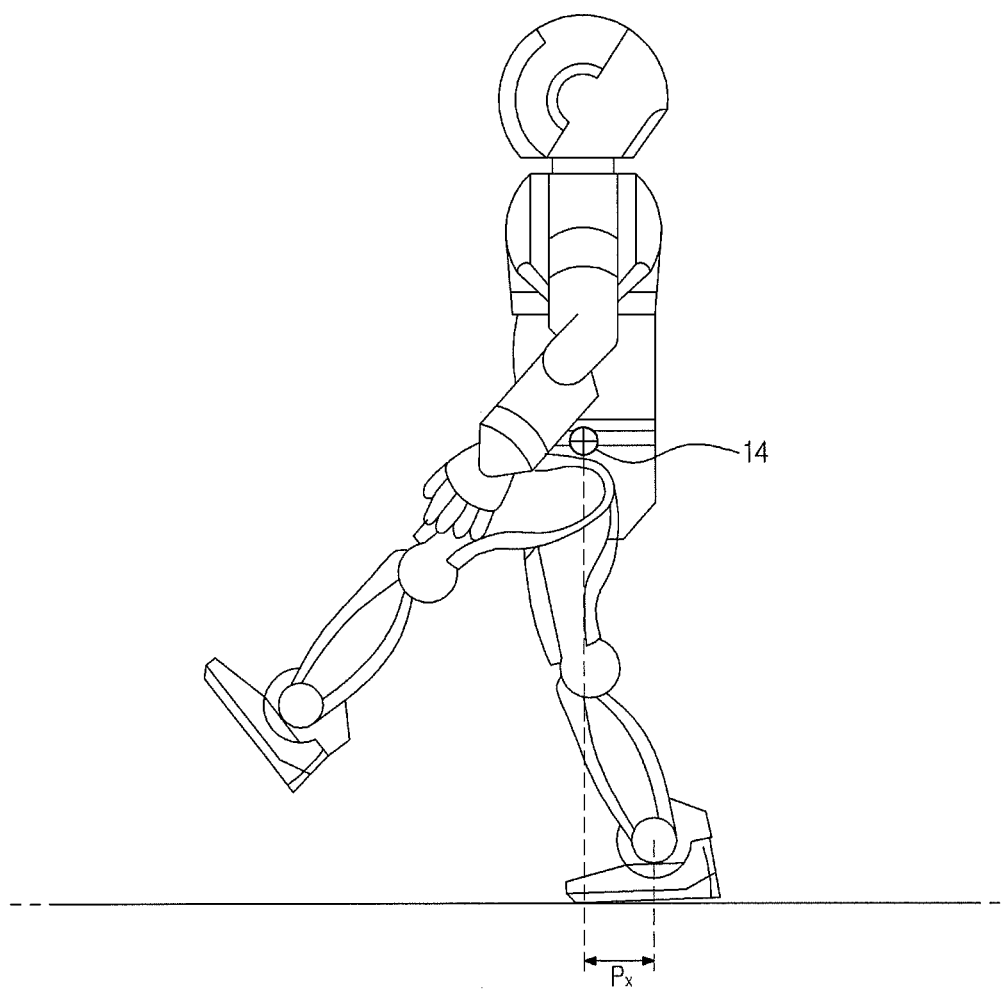
FIGS. 5A and 5B illustrate a change in Center Of Mass (COM) of the robot according to the embodiment.
Figure 5B:
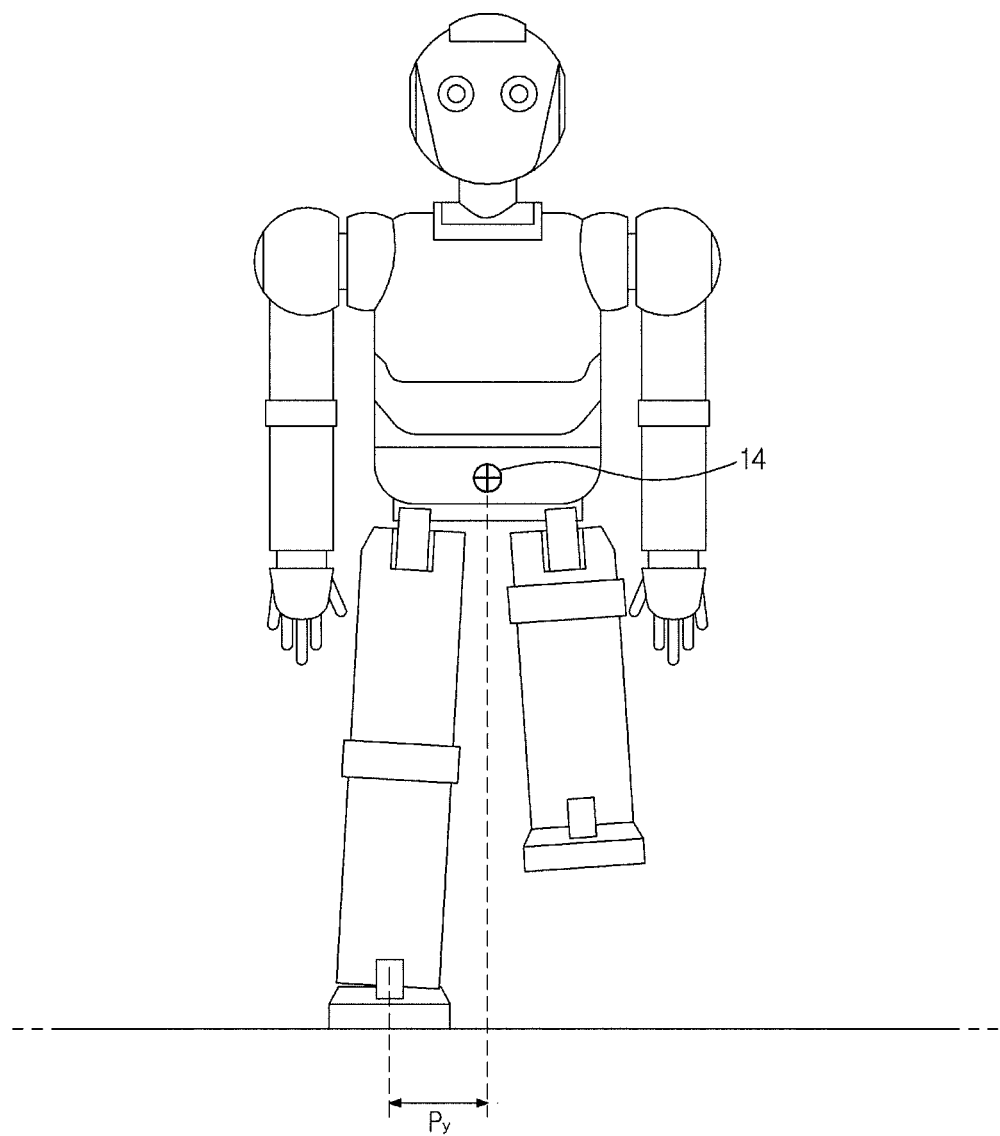

That is, as shown in FIGS. 5A and 5B, the COM sensor senses a change Px in COM of an X-axis direction corresponding to the walking direction of the robot and a change Py in COM of a Y-axis direction corresponding to the left-and-right direction of the robot.

The change in COM refers to a distance between a vertical line position of the COM of the robot and an ankle position of a foot landing on the ground.

That is, in order to enable the robot to maintain balance while walking, the vertical line of the COM of the robot needs to coincide with the ankle position of the foot landing on the ground. Therefore, the distance between the vertical line position of the COM of the robot and the ankle position of the foot landing on the ground is sensed.

The angular speed is acquired by differentiating the distance to acquire a speed and differentiating the acquired speed.

The force/torque sensor 24 is a multi-axis Force and Torque (F/T) sensor, which senses a weight applied to the foot 112L or 112R to generate the pose information of the robot in order to determine whether or not the foot 112L or 112R lands or to determine whether each leg is in a support state or a swing state according to landing.

That is, in order to sense the weight applied to the foot 112L or 112R, three-directional components Fx, Fy and Fz of force transferred from the foot 112L or 112R and three-directional components θx, θy and θz of moment are sensed and transmitted to the walking state determination unit 320.

The walking state determination unit 320 determines whether the foot lands and determines whether each leg is in a support state or a swing state, based on the weight applied to the foot of each leg sensed by the force/torque sensor 24 of the pose sensing unit 310.

That is, a leg to which the weight is applied is determined as a stance leg touching the ground and a leg to which the weight is not applied is determined as a swing leg which does not touch the ground.

When the two feet land on the ground, the support state and the swing state of each foot is switched based on the landing signal sensed by the force/torque sensor 24 of the ankle. This will be described with reference to FIG. 6.

Figure 6:
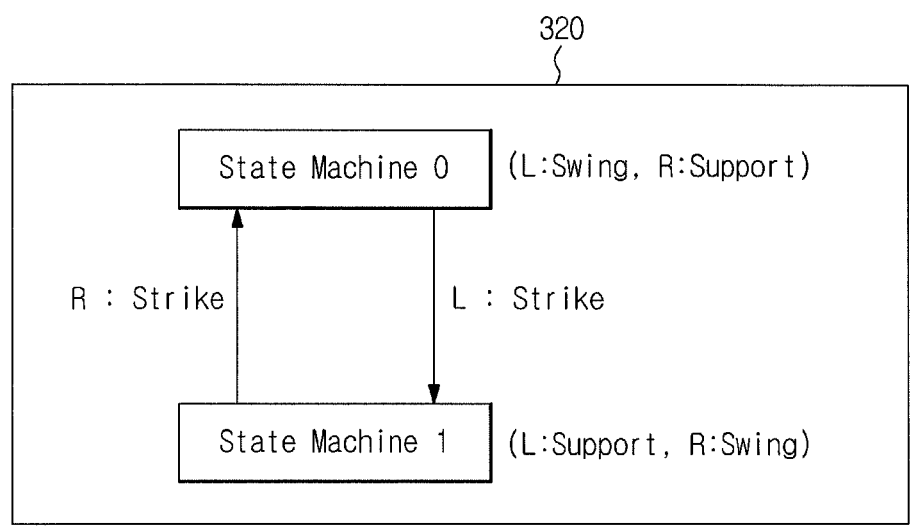
FIG. 6 illustrates in detail a walking state determination unit of the walking control apparatus of the robot according to the embodiment.

FIG. 6 shows the walking state determination unit of the walking control apparatus of the robot according to the embodiment.

The walking state determination unit 320 determines that the robot is in a landing state, when the weight is applied to at least one of the two legs.

The walking state determination unit 320 determines to which leg the weight is applied. At this time, if it is determined that the weight is applied to the foot of the right leg, it is determined that the right leg is in the support state and the left leg is in the swing state. This state is recognized as "State Machine 0".

If it is determined that the weight is applied to the foot of the left leg, the walking state determination unit 320 determines that the left leg is in the support state and the right leg is in the swing state. This state is recognized as "State Machine 1". The recognized data is transmitted to the angle trajectory generator 340.

The walking state determination unit 320 stores walking state data of the leg based on Finite State Machine (FSM). The FSM sequentially represents a change in restricted states of two legs.

The knot point compensation value calculator 330 calculates a compensation value of a reference knot point based on the information about the change in COM sensed by the COM sensor of the pose sensing unit 310.

More particularly, the knot point compensation value calculator 330 compares information about a change in current actual COM sensed by the COM sensor of the pose sensing unit 310 with information about a change in current reference COM and calculates the compensation value to compensate for the reference knot point.

That is, a knot point compensation value calculation equation using derivative control is as follows.

$$\Delta S = K_d * (P_c' - P_r')$$ Equation 1 where, $k_d$ denotes D gain of derivative control, $P_c'$ denotes information about a change in actual COM, and $P_r'$ denotes information about a change in reference COM.

$P_c$ denotes a change Py in actual COM of an Y-axis direction corresponding to the walking direction of the robot. That is, $P_c$ denotes the actual distance between the vertical line position of the COM of the robot and the ankle position of the foot landing on the ground, and $P_c'$ denotes an actual angular speed obtained by differentiating the actual distance.

$P_r$ denotes a change in reference COM of an Y-axis direction corresponding to the walking direction of the robot. That is, $P_r$ denotes a reference distance between the vertical line position of the COM of the robot and the ankle position of the foot landing on the ground, and $P_r'$ denotes a reference angular speed obtained by differentiating the reference distance.

The D gain $k_d$ is a value determined through repeated experimentation, for optimal stable walking. The information about the change in reference COM is set in advance in correspondence with the walking state of the robot.

The angle trajectory generator 340 generates a reference angle trajectory of the joint portion of each leg of a next step based on the state information of each leg of a current step determined by the walking state determination unit 320.

At this time, the angle trajectory generator 340 sets the angles of the hip joint portion 210 at an intermediate point and a last point of the next step as reference knot points, and connects the reference knot points so as to generate the reference angle trajectory.

The angles of the hip joint portion 210 of each of the stance leg and the swing leg at the intermediate point and the last point of one step are determined through experimentation.

The angle trajectory generator 340 applies the knot point compensation value calculated in the current state to the reference knot point of the next step so as to generate desired knot points, connects the desired knot points so as to generate desired angle trajectory, and transmits the generated desired angle trajectory to the torque calculator 350. This will be described in detail with reference to FIGS. 7 and 8.

Figure 7:
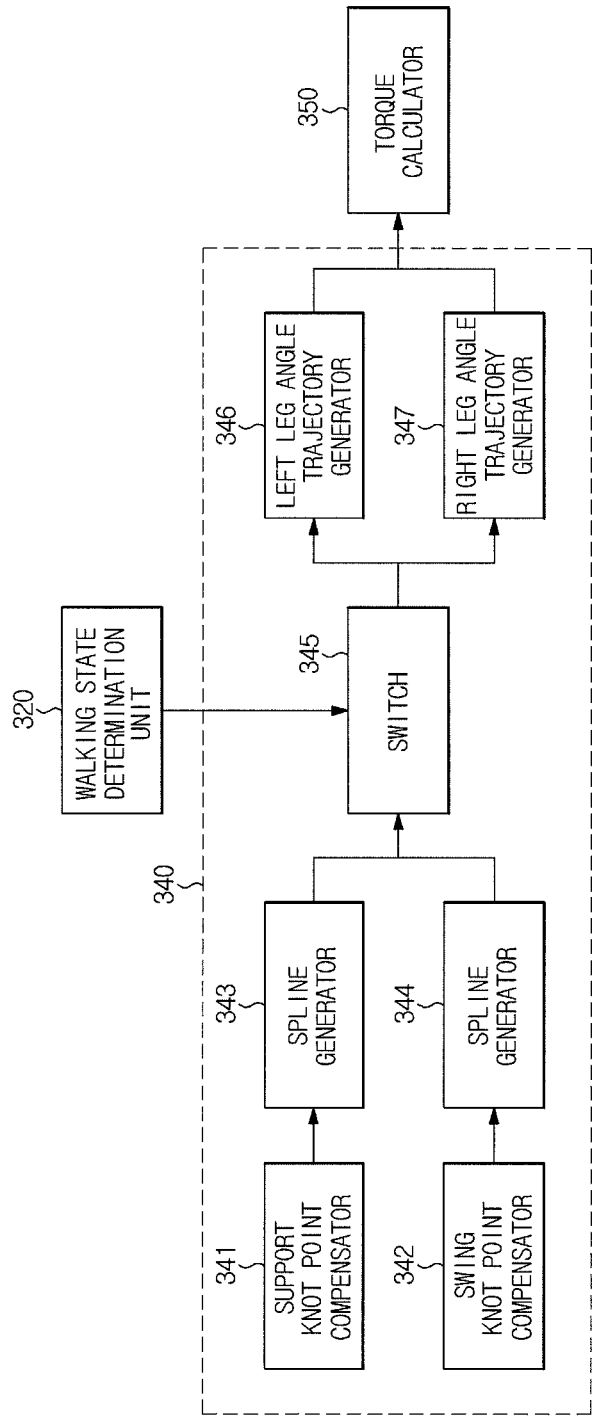
FIG. 7 illustrates a desired angle trajectory generator of the walking control apparatus of the robot according to the embodiment.
Figure 8:
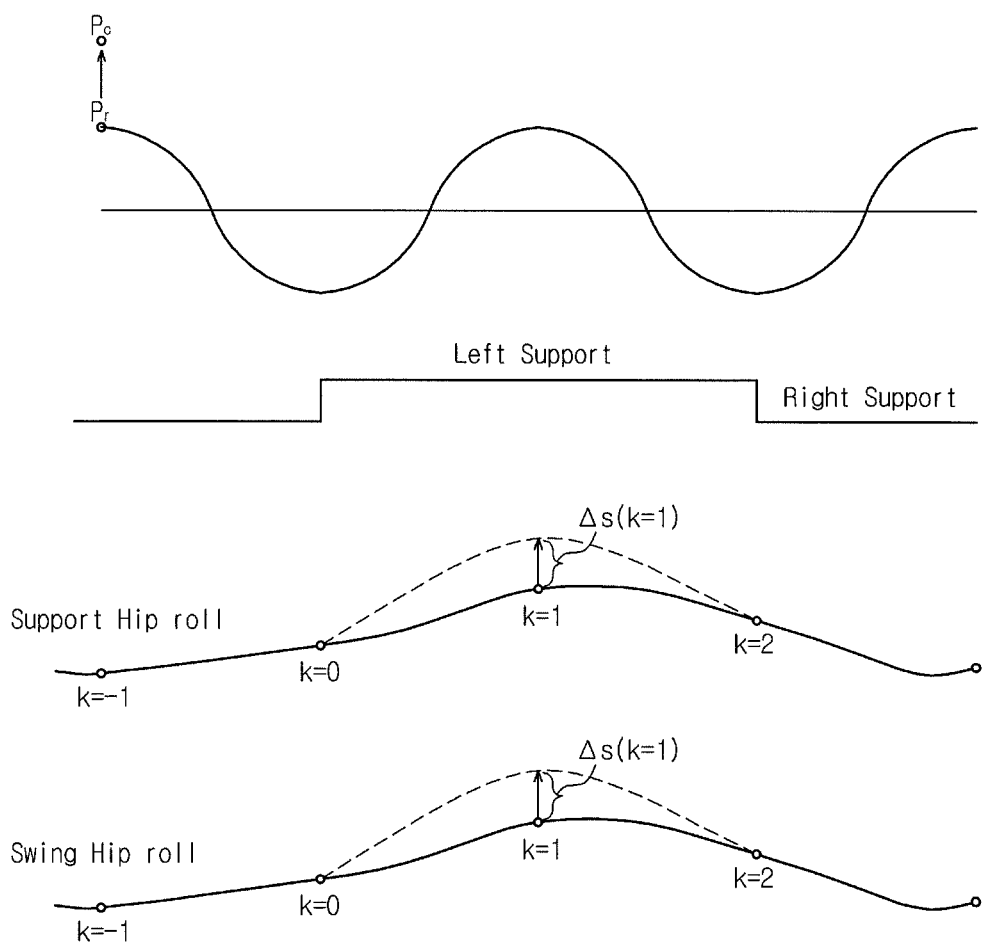
FIG. 8 illustrates desired angle trajectory generation of the walking control apparatus of the robot according to the embodiment.

FIG. 7 illustrates the angle trajectory generator 340 of the walking control apparatus of the robot according to an embodiment, and FIG. 8 illustrates desired angle trajectory generation of the walking control apparatus of the robot according to an embodiment.

As shown in FIG. 7, the angle trajectory generator 340 may include a support knot point compensator 341, a swing knot point compensator 342, spline generators 343 and 344, a switch 345, a left leg angle trajectory generator 346 and a right leg angle trajectory generator 347.

As shown in FIG. 8, the support knot point compensator 341 compensates for a reference knot point of the hip joint portion 210 of a stance leg to be supported in a next step (K=1) using the knot point compensation value ΔS of a current step (K=-1) calculated by the knot point compensation value calculator 330 so as to generate a desired knot point.

The swing knot point compensator 342 compensates for a reference knot point of the hip joint portion 210 of a swing leg to be swung in a next step (K=1) using the knot point compensation value ΔS of a current step (K=-1) calculated by the knot point compensation value calculator 330 to generate a desired knot point.

At this time, the reference knot point of the hip joint potion 210 of each of a stance leg and a swing leg is a reference roll angle of the hip joint portion, and the desired knot point is a desired roll angle of the hip joint portion.

The spline generators 343 and 344 respectively connect the desired knot points compensated for by the support knot point compensator 341 and the swing knot point compensator 342 using spline curves to generate a desired angle trajectory of the hip joint portion of each of the legs.

At this time, each of the spline generators 343 and 344 connects knot points positioned near the desired knot point on the basis of the desired knot point (K=1). That is, the knot point (K=0) present before the desired knot point (K=1) and the knot point (K=2) present after the desired knot point are connected on the basis of the desired knot point (K=1).

The switch 345 determines the stance leg and swing leg in correspondence with the walking state data (0 or 1) of each leg transmitted from the walking state determination unit 320, and transmits support desired angle trajectory data to the stance leg and transmits swing desired angle trajectory data to the swing data according to the determined result.

The left leg angle trajectory generator 346 generates a left desired angle trajectory, which the hip joint portion 210 of the left leg will follow, according to the desired angle data transmitted from the switch 345, and transmits the left desired angle trajectory to the torque calculator 350.

That is, if the left leg is in the support state, the support desired angle trajectory data is transmitted and, if the left leg is in the swing state, the swing desired angle trajectory data is transmitted.

The right leg angle trajectory generator 347 generates a right desired angle trajectory, which the hip joint portion 210 of the right leg will follow, according to the desired angle data transmitted from the switch 345, and transmits the right desired angle trajectory to the torque calculator 350.

That is, if the right leg is in the support state, the support desired angle trajectory data is transmitted and, if the right leg is in the swing state, the swing desired angle trajectory data is transmitted.

The torque calculator 350 calculates torque to follow the desired angle trajectory of each leg transmitted from the desired angle trajectory generator 340. At this time, torque to control the roll angle of the hip joint portion 210 of each leg is calculated.

The torque calculator 350 uses Proportional-Derivative (PD) control when calculating the torque to be applied to the hip joint portion 210. A torque calculation equation is as follows.

$$T = k_{p1}(\theta_d - \theta_c) + k_{d2}(\theta_d' - \theta_c')$$ Equation 2 where, $k_{p1}$ denotes P gain of PD control, $K_{d2}$ denotes D gain of PD control, $\theta_d$ denotes a desired angle of a next step of a hip joint portion, and $\theta_c$ denotes an actual angle of a current step of a hip joint portion. The P and D gains are acquired through experimentation, for stable walking.

The torque is rotation force to be applied to the hip joint portion in order to follow the desired angle trajectory.

The servo controller 360 controls a Pulse Width Modulation (PWM) signal corresponding to the torque calculated by the torque calculator 350 and outputs the PWM signal to the joint portion 210.

The robot may stably walk by adjusting the position angle trajectory while compensating for the roll angle of the hip joint portion using the information about the change in COM.

In addition, an impedance controller (not shown) to output a signal to perform impedance control (rigidity control) of each joint portion according to the state of each joint portion may be further included.

Figure 9:
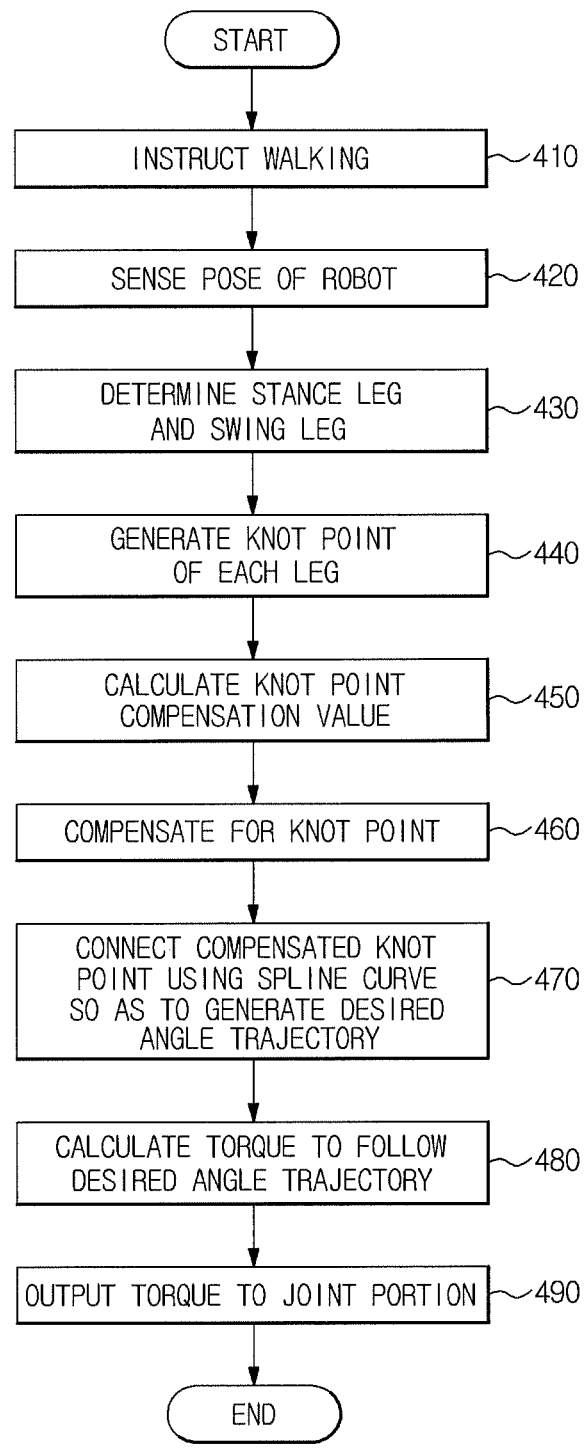
FIG. 9 is a flowchart illustrating a walking control method of a robot according to an embodiment.

FIG. 9 is a flowchart illustrating a walking control method of a robot according to an embodiment of the present invention.

It is determined whether the user command to instruct the walking of the robot is input through the user interface (not shown). If it is determined that the user command is input (410), the pose of the robot is sensed (420).

The weight applied to each ankle in the pose sensing data of the robot is determined, a stance leg and a swing leg are determined based on the weight applied to each ankle (430), and a reference knot point of the joint portion of each of the stance leg and the swing leg of a next step is generated (440).

Next, the information about the change in COM of the robot in the pose sensing data of the robot is determined, and the information about the change in actual COM of the current step is compared with the information about the change in reference COM of the current step to calculate the knot point compensation value (450). At this time, the knot point compensation value is calculated using derivative control.

That is, the knot point compensation value calculation equation using derivative control is as follows.

$$\Delta S = K_d^* (P_c' - P_r')$$ Equation 1 where, $k_d$ denotes D gain of derivative control, $P_c'$ denotes information about a change in actual COM, and $P_r'$ denotes information about a change in reference COM.

The D gain $k_d$ is a value determined through repeated experimentation, for optimal stable walking. The information about the change in reference COM is set in advance in correspondence with the walking state of the robot.

The reference knot point of the hip joint portion 210 of the stance leg to be supported at the next step (K=1) is compensated for using the knot point compensation value $\Delta S$ of the current step (K=−1) to generate the desired knot point.

In addition, the reference knot point of the hip joint portion 210 of the swing leg to be swung at the next step (K=1) is compensated for using the knot point compensation value $\Delta S$ of the current step (K=−1) (460) so as to generate the desired knot point.

At this time, the reference knot point of the hip joint potion 210 of each of the stance leg and the swing leg is a reference roll angle of the hip joint portion, and the desired knot point is a desired roll angle of the hip joint portion.

Next, the desired knot point of each of the legs is connected using the spline curve so as to generate the desired angle trajectory of the hip joint portion 210 of each of the legs (470).

At this time, on the basis of the desired knot point (K=1), the desired knot point (K=1) and the knot point (K=0) present before the desired knot point (K=1) are connected using the spline curve and the desired knot point (K=1) and the knot point (K=2) present after the desired knot point are connected using the spline curve.

Next, the stance and swing legs of the next step are determined in correspondence with the walking state data (0 or 1) of the legs determined by the walking state determination unit 320, the roll angle of the hip joint portion 210 of the stance leg follows the support desired angle trajectory, and the roll angle of the hip joint portion 210 of the swing leg follows the swing desired angle trajectory.

That is, the desired angle trajectories which the hip joint portions 210 of the right and left legs follow are generated in correspondence with the stance and swing legs.

The torque to follow the desired angle trajectory of each of the legs is calculated (480). At this time, the torque to control the roll angle of the hip joint portion 210 of each of the legs is calculated.

PD control is used when calculating the torque to be applied to the hip joint portion 210 of each of the legs, and the torque calculation equation is as follows.

$$T = k_{p1}(\theta_d - \theta_c) + k_{d2}(\theta_d' - \theta_c')$$ Equation 2 where, $k_p$ denotes P gain of PD control, $k_d$ denotes D gain of PD control, $\theta_d$ denotes a desired angle of a next step of the hip joint portion, and $\theta_c$ denotes an actual angle of a current step of the hip joint portion. The P and D gains are acquired through experimentation, for stable walking.

Next, the PWM signal corresponding to the calculated torque is controlled and is output to the hip joint portion 210 (490).

The knot point which is the angle command of the hip joint portion of each of the legs to perform a next step is compensated for based on the COM, and the compensated desired knot point is smoothly connected using the spline curve such that the robot walks similar to a human.

In addition, in order to maintain balance while walking, the angle of the joint portion of the intermediate point of the current step is fed back and the knot point of the next step is predicted and adjusted, such that the robot stably walks.

The above-described embodiment has a configuration in which the roll angle of the hip joint portion of each of the legs is controlled. Another embodiment has a configuration in which a roll angle and a pitch angle of a hip joint portion of a swing leg of a robot are controlled.

A walking control apparatus of a robot according to another embodiment will be described with reference to FIGS. 4 and 10.

The pose sensing unit 310 of the walking control apparatus of the robot senses the pose of the robot and transmits the sensed pose information to the walking state determination unit 320 and the knot point compensation value calculator 330.

The pose information of the robot includes information indicating whether or not the robot lands, information about a stance leg and a swing leg, which are changed by landing, and information about a Center Of Mass (COM) of the robot.

The pose sensing unit 310 includes a COM sensor (not shown) to sense the COM of the robot and a force/torque sensor 24 to sense whether or not the robot lands and to sense a stance leg and a swing leg according to whether or not the robot lands.

The COM sensor of the pose sensing unit 310 senses the COM of the robot based on the rotation angle of each joint portion corresponding to the actual pose of the robot when the robot walks, calculates a change in sensed COM, and transmits the calculated change in COM to the knot point compensation value calculator 330.

That is, as shown in FIGS. 5A and 5B, the COM sensor senses a change Px in COM of an X-axis direction corresponding to the walking direction of the robot and a change Py in COM of a Y-axis direction corresponding to the left-and-right direction of the robot.

The change in COM refers to a distance between a vertical line position of the COM of the robot and an ankle position of a foot landing on the ground.

That is, in order to enable the robot to maintain balance while walking, the vertical line of the COM needs to coincide with the ankle position of the foot landing on the ground. Therefore, the distance between the vertical line position of the COM of the robot and the ankle position of the foot landing on the ground is sensed.

The force/torque sensor 24 is a multi-axis Force and Torque (F/T) sensor, which senses a weight applied to the foot 112L or 112R to generate the pose information of the robot, in order to determine whether the foot 112L or 112R lands or to determine whether each leg is in a support state or a swing state according to landing.

That is, in order to sense the weight applied to the foot 112L or 112R, three-directional components Fx, Fy and Fz of force transferred from the foot 112L or 112R and three-directional components θx, θy and θz of moment are sensed and transmitted to the walking state determination unit 320.

The walking state determination unit 320 determines whether the foot lands and determines whether each leg is in a support state or a swing state, based on the weight applied to the foot of each leg sensed by the force/torque sensor 24 of the pose sensing unit 310.

When the two feet land on the ground, the support state and the swing state of each foot is switched based on the landing signal sensed by the force/torque sensor 24 of the ankle.

The walking state determination unit 320 determines to which leg the weight is applied. At this time, if it is determined that the weight is applied to the foot of the right leg, it is determined that the right leg is in the support state and the left leg is in the swing state. This state is recognized as "State Machine 0".

If it is determined that the weight is applied to the foot of the left leg, the walking state determination unit 320 determines that the left leg is in the support state and the right leg is in the swing state. This state is recognized as "State Machine 1". The recognized data is transmitted to the desired angle trajectory generator 340.

The walking state determination unit 320 stores walking state data of the leg based on Finite State Machine (FSM). The FSM sequentially represents a change in restricted states of two legs.

The knot point compensation value calculator 330 calculates a compensation value of a reference knot point based on the information about the change in COM sensed by the COM sensor of the pose sensing unit 310.

At this time, the knot point compensation value calculator 330 calculates a roll knot point compensation value $\Delta R$ and a pitch knot point compensation value $\Delta P$ of the swing leg of the next step.

More particularly, the knot point compensation value calculator 330 determines a change in actual COM of an Y-axis direction of the current step sensed by the COM sensor of the pose sensor 310, compares the change in actual COM of the Y-axis direction with a change in reference COM, and calculates the roll knot point compensation value $\Delta R$ of the swing leg of the next step.

The knot point compensation value calculator 330 determines a change in actual COM of a X-axis direction of the current step sensed by the COM sensor of the pose sensor 310, compares the change in actual COM of the X-axis direction with a change in reference COM, and calculates the pitch knot point compensation value $\Delta P$ of the swing leg of the next step.

At this time, the knot point compensation values are calculated using PD control. The knot point compensation value calculation equations using PD control are as follows.

$$\Delta R = K_{p2}(P_{c1} - P_{r1}) + k_{d2}(P_{c1}' - P_{r1}') \qquad \text{Equation 3}$$

$$\Delta P = K_{p3}(P_{c2} - P_{r2}) + k_{d3}(P_{c2}' - P_{r2}') \qquad \text{Equation 4}$$

where, $k_{p2}$ and $k_{p3}$ denote P gains of PD control, and $k_{d2}$ and $k_{d3}$ denote D gains of PD control. $P_{c1}$ denotes a change in actual COM of the X-axis direction corresponding to the walking direction of the robot, and $P_{c2}$ denotes a change in actual COM of the Y-axis direction corresponding to the walking direction of the robot.

$P_{c1}$ denotes a change in actual COM of the Y-axis direction corresponding to the walking direction of the robot, and $P_{c2}$ denotes a change in actual COM of the X-axis direction corresponding to the walking direction of the robot.

That is, $P_{c1}$ denotes an actual distance between a vertical line position of the COM of the robot and an ankle position of the Y-axis direction of the foot landing on the ground, $P_{c1}'$ denotes an actual angular speed obtained by differentiating the actual distance, $P_{c2}$ denotes an actual distance between a vertical line position of the COM of the robot and an ankle position of the X-axis direction of the foot landing on the ground, $P_{c2}'$ denotes an actual angular speed obtained by differentiating the actual distance.

$P_{r1}$ denotes a change in reference COM of the Y-axis direction corresponding to the walking direction of the robot, and $P_{r2}$ denotes a change in reference COM of the X-axis direction corresponding to the walking direction of the robot.

That is, $P_{r1}$ denotes a reference distance between a vertical line position of the COM of the robot and an ankle position of the Y-axis direction of the foot landing on the ground, and $P_c'$ denotes a reference angular speed obtained by differentiating this reference distance.

$P_{r2}$ denotes a reference distance between a vertical line position of the COM of the robot and an ankle position of the X-axis direction of the foot landing on the ground, and $P_c'$ denotes a reference angular speed obtained by differentiating this reference distance.

The PD gain is a value determined through repeated experimentation, for optimal stable walking. The positional information of the reference COM is set in advance in correspondence with the walking state of the robot.

The angular speeds $P_{c1}'$ and $P_{c2}'$ may be directly sensed.

The desired angle trajectory generator 340 generates the reference angle trajectory of the joint portion of each of the legs of the next step based on the leg state information of the current step determined by the walking state determination unit 320.

At this time, the desired angle trajectory generator 340 sets the angles of the hip joint portion 210 at the intermediate point and the last point of the next step as the reference knot points, and connects the reference knot points to generate the reference angle trajectory.

The angles of the hip joint portion 210 of the stance leg and the swing leg at the intermediate point and the last point of one step are determined through experimentation.

The desired angle trajectory generator 340 applies the knot point compensation value calculated at the current step to the reference knot point of the hip joint portion 210 of the swing leg of the next step to generate desired knot points, connects the desired knot points to generate a desired angle trajectory, and transmits the generated desired angle trajectory to the torque calculator 350. This will be described in detail with reference to FIG. 10A and FIG. 10B.

Figure 10A:
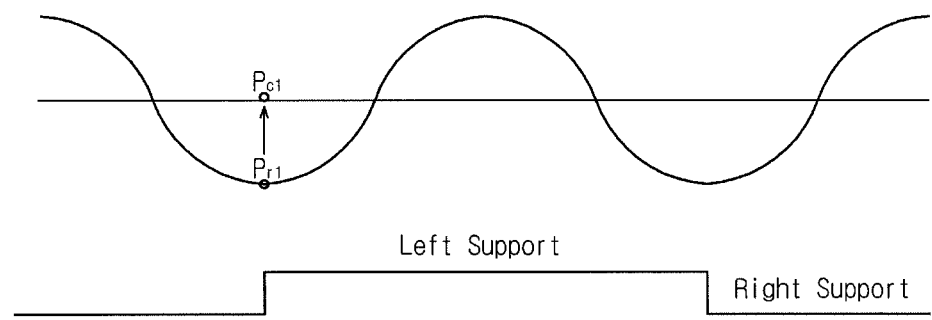
FIGS. 10A and 10B illustrate desired angle trajectory generation of a walking control apparatus of a robot according to another embodiment.
Figure 10A:
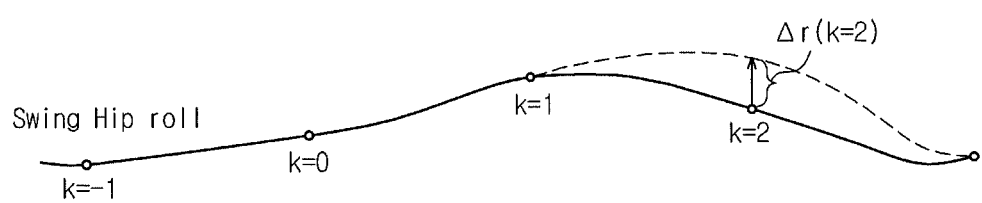
Figure 10B:
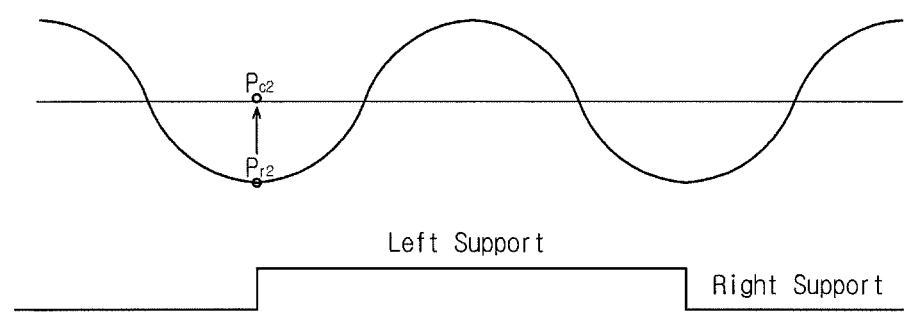
Figure 10B:
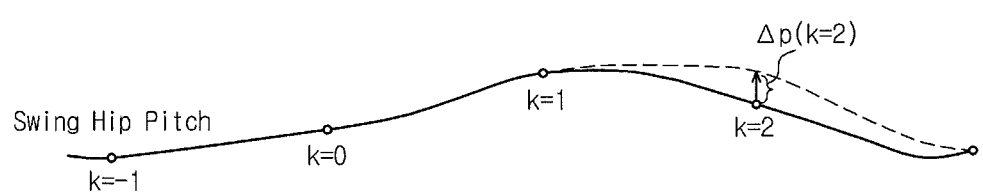

FIGS. 10A and 10B illustrate desired angle trajectory generation of a walking control apparatus of a robot according to another embodiment.

As shown in FIG. 10A, the roll reference knot point of the hip joint portion 210 of the swing leg at the next step (K=2) is compensated for using the roll knot point compensation value ΔR of the current step (K=0) calculated by the knot point compensation value calculator 330 so as to generate the roll desired knot point of the hip joint portion 210.

At this time, the reference knot point of the hip joint portion 210 of the swing leg is the reference roll angle of the hip joint portion 210, and the desired knot point is the desired roll angle of the hip joint portion 210.

The desired angle trajectory generator 340 connects the roll desired knot point using the spline curve to generate the roll desired angle trajectory of the hip joint portion of the swing leg.

As shown in FIG. 10B, the pitch reference knot point of the hip joint portion 210 of the swing leg at the next step (K=2) is compensated for using the pitch knot point compensation value ΔR of the current step (K=0) calculated by the knot point compensation value calculator 330 to generate the pitch desired knot point of the hip joint portion 210.

At this time, the pitch reference knot point of the hip joint portion 210 of the swing leg is the reference pitch angle of the hip joint portion 210, and the pitch desired knot point is the desired pitch angle of the hip joint portion 210.

The desired angle trajectory generator 340 connects the pitch desired knot point using the spline curve to generate the pitch desired angle trajectory of the hip joint portion 210 of the swing leg.

When the knot point compensation value is calculated, the compensation value of the knot point at the intermediate point (K=−1) of one step is calculated to compensate for the knot point at the intermediate point (K=1) of a next step.

At this time, the compensation value of the knot point at the last point (K=0) of one step may be calculated so as to compensate for the knot point at the last point (K=2) of the next step.

In addition, even in knot points present in one step, the compensation value of the knot point of the intermediate point (K=1) of the current step may be calculated to compensate for the knot point of the last point (K=2) of the current step.

Upon connection using the spline curve, the knot point (K=1) presents before the desired knot point (K=2) and the knot point (K=3) not shown presents after the knot point (K=1) is connected on the basis of the desired knot point (K=2).

The torque calculator 350 calculates the torque to follow the roll desired angle trajectory and the pitch desired angle trajectory of the leg to be swung, which are transmitted from the desired angle trajectory generator 340.

At this time, the torque to control the roll angle and the pitch angle of the hip joint portion 210 of the swing leg is calculated.

The torque calculator 350 uses PD control when calculating the torque to be applied to the hip joint portion 210. A torque calculation equation is as follows.

$$T_r = k_{p4}(\theta_{d1} - \theta_{c1}) + k_{d4}(\theta_{d1}' - \theta_{c1}') \quad \text{Equation 5}$$

$$T_p = k_{p5}(\theta_{d2} - \theta_{c2}) + k_{d5}(\theta_{d2}' - \theta_{c2}') \quad \text{Equation 6}$$

where, $k_{p4}$ and $k_{p5}$ denote P gains of PD control, $k_{d4}$ and $k_{d5}$ denote D gains of PD control, $\theta_{d1}$ and $\theta_{d2}$ denote desired angles of the next step of the hip joint portion, and $\theta_{c1}$ and $\theta_{c2}$ denote actual angles of the current step of the hip joint portion. The P and D gains are acquired through experimentation, for stable walking.

The torque is rotation force to be applied to the hip joint portion to follow the desired angle trajectory.

The servo controller 360 controls a PWM signal corresponding to the roll and pitch torques calculated by the torque calculator 350 and outputs the PWM signal to the joint portion 210.

The robot may stably walk by adjusting the position angle trajectory while compensating for the roll angle of the hip joint portion using the positional information of COM.

In addition, an impedance controller (not shown) to output a signal to perform impedance control (rigidity control) of each joint portion according to the state of each joint portion may be further included.

The knot point which is the angle command of the joint portion of each of the legs to perform the next step is compensated for based on the COM, and the compensated desired knot point is smoothly connected using the spline curve such that the robot walks similar to a human.

In addition, in order to maintain balance while walking, the angle of the joint portion of the intermediate point of the current step is fed back and the knot point of the next step is predicted and adjusted, such that the robot stably and smoothly walks.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A walking control apparatus of a robot comprising:
a joint portion provided in each of a plurality of legs of the robot;
a pose sensing unit to sense the pose of the robot;
a walking state determination unit to determine a walking state from the pose of the robot;
a knot point compensation value calculator to determine a Center Of Mass (COM) of the robot from the pose of the robot and to calculate a knot point compensation value based on the COM and one or more reference values; and
a desired angle trajectory generator to generate a reference knot point of the joint portion corresponding to the walking state, to compensate for the reference knot point using the knot point compensation value to generate a desired knot point, and to generate a desired angle trajectory of the joint portion using the desired knot point.

2. The walking control apparatus according to claim 1, further comprising:
a torque calculator to calculate torque to follow the desired angle trajectory; and
a servo controller to output the torque to the joint portion and to control the walking of the robot.

3. The walking control apparatus according to claim 1, wherein the desired angle trajectory generator includes a spline generator to connect the desired knot point using a spline curve.

4. The walking control apparatus according to claim 1, wherein the knot point compensation value calculator determines an angular speed of a change in COM, compares the angular speed of the change in COM with a reference angular speed, and calculates the knot point compensation value.

5. The walking control apparatus according to claim 1, wherein the joint portion is a hip joint portion to move a thighbone portion of the robot.

6. The walking control apparatus according to claim 5, wherein the desired knot point is at least one of a desired roll angle and a desired pitch angle of the hip joint portion.

7. The walking control apparatus according to claim 1, wherein the walking state determination unit determines a stance leg which touches the ground and a swing leg which does not touch the ground.

8. The walking control apparatus according to claim 7, wherein the desired angle trajectory generator generates the reference knot point of the joint portion of each of the stance leg and the swing leg, compensates for the reference knot point using the knot point compensation value, and generates the desired angle trajectory of the joint portion of each of the support leg and the swing leg using the compensated knot point.

9. The walking control apparatus according to claim 7, wherein the desired angle trajectory generator generates the reference knot point of the joint portion of the swing leg, compensates for the reference knot point using the knot point compensation value, and generates the desired angle trajectory of the joint portion of the swing leg using the compensated knot point.

10. The walking control apparatus according to claim 1, wherein the desired angle trajectory generator comprises:
a support knot point compensator to compensate a reference knot point of the hip joint portion and generate a support knot point;
a swing knot point compensator to compensate a reference knot point of the hip joint portion and generate a swing knot point;
spline generators respectively to connect the desired knot points compensated for by the support knot point compensator and the swing knot point compensator using spline curves to generate a desired angle trajectory of the hip joint portion of each of the legs;
a switch to determine the stance leg and swing leg in correspondence with the walking state data (0 or 1) of each leg transmitted from the walking state determination unit, and transmit support desired angle trajectory data to the stance leg to transmit swing desired angle trajectory data to the swing leg according to the determined result; and
the left leg angle trajectory generator to generate a left desired angle trajectory, which the hip joint portion of the left leg will follow, according to the desired angle data transmitted from the switch, and to transmit the left desired angle trajectory to the torque calculator.

11. A walking control apparatus of a robot comprising:
a joint portion provided in each of a plurality of legs of the robot;
a pose sensing unit to sense the pose of the robot;
a walking state determination unit to determine a walking state from the pose of the robot;
a knot point compensation value calculator to determine a Center Of Mass (COM) of the robot from the pose of the robot and to calculate a knot point compensation value; and
a desired angle trajectory generator to generate a reference knot point of the joint portion corresponding to the walking state, to compensate for the reference knot point using the knot point compensation value to generate a desired knot point, and to generate a desired angle trajectory of the joint portion using the desired knot point, wherein the knot point compensation value calculator determines a distance of a change in COM in an X-axis direction, compares the determined distance of the change in COM with a reference distance, and calculates the knot point compensation value.

12. A walking control apparatus of a robot comprising:
a joint portion provided in each of a plurality of legs of the robot;
a pose sensing unit to sense the pose of the robot;
a walking state determination unit to determine a walking state from the pose of the robot;
a knot point compensation value calculator to determine a Center Of Mass (COM) of the robot from the pose of the robot and to calculate a knot point compensation value; and
a desired angle trajectory generator to generate a reference knot point of the joint portion corresponding to the walking state, to compensate for the reference knot point using the knot point compensation value to generate a desired knot point, and to generate a desired angle trajectory of the joint portion using the desired knot point, wherein the knot point compensation value calculator determines a distance of a change in COM in a Y-axis direction, compares the determined distance of the change in COM with a reference distance, and calculates the knot point compensation value.

13. A walking control method of a robot comprising:
sensing a weight applied to a foot of the robot by way of a force/torque sensor;
determining a walking state of the robot using the sensed weight when the robot walks;
generating a reference knot point corresponding to the walking state of the robot;
sensing a Center Of Mass (COM) of the robot so as to calculate, by way of a knot point compensation value calculator, a knot point compensation value based on the COM and one or more reference values;
generating a desired knot point obtained by compensating for the reference knot point using the knot point compensation value; and
connecting the desired knot point so as to generate a desired angle trajectory of a joint portion provided in each leg of the robot.

14. The walking control method according to claim 13, further comprising:
calculating torque to follow the desired angle trajectory; and
generating and outputting a Pulse Width Modulation (PWM) signal corresponding to the torque to the joint portion of the robot.

15. The walking control method according to claim 13, wherein the generating of the desired angle trajectory includes connecting the desired knot point using a spline curve.

16. The walking control method according to claim 13, wherein the determining of the walking state includes:
sensing a weight applied to each foot of the robot;
determining that a leg to which the weight is applied is a stance leg which touches the ground; and
determining that a leg to which the weight is not applied is a swing leg which does not touch the ground.

17. The walking control method according to claim 16, wherein the calculating of the knot point compensation value includes:
determining an angular speed of the COM of an X-axis direction; and comparing the determined angular speed of the COM of the X-axis direction with a reference angular speed so as to calculate the knot point compensation value.

18. The walking control method according to claim 17, wherein the generating of the desired angle trajectory includes generating a pitch desired angle trajectory of a hip joint portion provided in each leg of the robot.

19. The walking control method according to claim 18, wherein the generating of the desired angle trajectory includes generating a pitch desired angle trajectory of the hip joint portion provided in each of a stance leg and a swing leg of the robot.

20. The walking control method according to claim 13, further comprising:
    calculating a knot point compensation value at a current step while the robot walks;
    generating a reference knot point of a next step while the robot walks; and
    compensating for the reference knot point of the next step to generate the desired angle trajectory of the joint portion of the next step.

21. A walking control method of a robot comprising:
    sensing a weight applied to a foot of the robot by way of a force/torque sensor;
    determining a walking state of the robot using the sensed weight when the robot walks;
    generating a reference knot point corresponding to the walking state of the robot;
    sensing a Center Of Mass (COM) of the robot so as to calculate, by way of a knot point compensation value calculator, a knot point compensation value based on the COM and one or more reference values;
    generating a desired knot point obtained by compensating for the reference knot point using the knot point compensation value; and
    connecting the desired knot point so as to generate a desired angle trajectory of a joint portion provided in each leg of the robot,
    wherein the determining of the walking state includes:
        sensing a weight applied to each foot of the robot;
        determining that a leg to which the weight is applied is a stance leg which touches the ground; and
        determining that a leg to which the weight is not applied is a swing leg which does not touch the ground, and
    wherein the calculating of the knot point compensation value includes:
        determining a distance of a change in COM in an X-axis direction;
        comparing the determined distance of the change in COM in the X-axis direction with a reference distance of the X-axis direction so as to calculate a pitch knot point compensation value;
        determining a distance of a change in COM in a Y-axis direction; and
        comparing the determined distance of the change in COM in the Y-axis direction with a reference distance of the Y-axis direction so as to calculate a roll knot point compensation value.

22. The walking control method according to claim 21, wherein the generating of the desired angle trajectory includes:
    generating a roll desired angle trajectory of a hip joint portion provided in each leg of the robot; and
    generating a pitch desired angle trajectory of the hip joint portion provided in each leg of the robot.

23. The walking control method according to claim 22, wherein the generating of the desired angle trajectory includes generating a roll desired angle trajectory and a pitch desired angle trajectory of the hip joint portion provided in a swing leg of the robot.

* * * * *

UNITED STATES PATENT AND TRADEMARK OFFICE
CERTIFICATE OF CORRECTION

PATENT NO. : 8,688,273 B2  Page 1 of 1
APPLICATION NO. : 13/005262
DATED : April 1, 2014
INVENTOR(S) : Lee et al.

It is certified that error appears in the above-identified patent and that said Letters Patent is hereby corrected as shown below:

On the Title Page Item [75] (Inventors), Line 2, delete "(KP);" and insert -- (KR); --, therefor.

Signed and Sealed this
Nineteenth Day of August, 2014

Michelle K. Lee
*Deputy Director of the United States Patent and Trademark Office*